United States Patent [19]

Kühnel et al.

[11] 4,266,041

[45] May 5, 1981

[54] PROCESS FOR THE PRODUCTION OF FOAMED PLASTICS FROM POLYOLEFINS

[75] Inventors: Werner Kühnel, Neunkirchen-Schöneshof; Paul Spielau, Troisdorf-Eschmar, both of Fed. Rep. of Germany

[73] Assignee: Dynamit Nobel Aktiengesellschaft, Troisdorf, Fed. Rep. of Germany

[21] Appl. No.: 99,144

[22] Filed: Nov. 30, 1979

[30] Foreign Application Priority Data

Dec. 2, 1978 [DE] Fed. Rep. of Germany ....... 2852287

[51] Int. Cl.$^3$ .............................. C08J 9/06; C08J 9/10
[52] U.S. Cl. ........................................ 521/92; 521/79; 521/95; 521/96; 521/143; 521/144; 521/909
[58] Field of Search ................... 521/79, 143, 144, 92, 521/96

[56] References Cited

U.S. PATENT DOCUMENTS

| | | | |
|---|---|---|---|
| 3,461,087 | 8/1969 | Pritchard | 521/92 |
| 3,645,930 | 2/1972 | Wormanton et al. | 521/139 |
| 4,166,890 | 9/1979 | Fried et al. | 521/143 |
| 4,187,352 | 2/1980 | Klobbie | 521/143 |

OTHER PUBLICATIONS

"Celogen-AZ", by R. R. Barnhart, Compounding Research Report No. 38, pp. 1-11, 1955.

*Primary Examiner*—Morton Foelak
*Attorney, Agent, or Firm*—Sprung, Felfe, Horn, Lynch & Kramer

[57] ABSTRACT

A process is described for the production of foamed plastics from polyolefins by peroxide crosslinking and foaming by means of a chemical foaming agent under conditions of normal pressure the improvement wherein said foaming is carried out in the additional presence of a finely divided magnesium oxide and/or magnesium hydroxide and/or magnesium-hydroxide carbonate.

7 Claims, No Drawings

PROCESS FOR THE PRODUCTION OF FOAMED PLASTICS FROM POLYOLEFINS

BACKGROUND OF THE INVENTION

1. Field of the Invention

The object of the invention is a process for the production of foamed plastics from polyolefins by peroxide crosslinking and foaming with a chemical foaming agent under conditions of normal pressure in the presence of a magnesium compound as an auxiliary foaming agent and, optionally, of other auxiliary agents.

2. Discussion of the Prior Art

It is known to mix polyolefins with organic peroxides and foaming agents. The polyolefins may be mixed with the crosslinking and foaming agents and, optionally, with conventional additives in a roll mill or an extruder, followed by production of the shaped articles, such as plates or continuous sheets, below the temperature of decomposition of the peroxide. The polyolefin then is crosslinked below the decomposition point of the foaming agent by decomposition of the crosslinking agent. The temperature then is raised to the decomposition range of the foaming agent, the polyolefin then being foamed by the gases so generated. The foaming agent preferably used in these so-called pressure-free foaming processes (which are carried out under conditions of normal pressure) is azodicarbonamide. The product obtained is a polyolefin foam having a relatively high density and an irregular foam structure. (U.S. Pat. No. 3,098,831 and German patent application No. 1,694,130.)

In principle, the density of the foamed plastic can be regulated by variation of the amount of foaming agent used. This does not, however, make it possible to obtain at the same time a foamed plastic having a uniform foam structure and surface, especially with low densities of the foamed plastic.

To increase the gas yield, it is known from German Pat. No. 1,936,098 to add to the foaming agent, azodicarbonamide, from 0.05 to 10 weight percent of a chromium compound as an auxiliary foaming agent. However, to obtain an appreciable increase in gas yield, and hence a reduction of the bulk density of the foamed plastic, relatively large amounts of chromium compound are required, and this has proved a drawback in several respects. The foamed plastics undergo discoloration the foam structure in nonuniform, and the surface is irregular. A further drawback is that when such large amounts of chromium compound are used, substantial capital expenditures are necessary for reasons of environmental protection, and these make the process unprofitable.

To lower the decomposition point of the azodicarbonamide, so-called kickers such as zinc, cadmium barium or lead compounds and, as disclosed in German patent application DOS 2,351,515, also magnesium compounds, have been used.

However, in the production of peroxide-crosslinked foamed plastics from a polyolefin by the "pressure-free" foaming method, the use of kickers poses problems. The substances employed interfere with the function of the peroxide, and hence with crosslinking, and in most cases also with the foaming process which follows, as a result of which foamed plastics of excessively high density are obtained. With the decomposition of the foaming agent setting in earlier, there is the danger that crosslinking may not have progressed sufficiently by the time the foaming agent is activated, with the result that foamed plastics having enlarged cells are obtained.

In another foaming process, in which polyethylene is first heated in a closed mold at a molding pressure of 80 bars to the decomposition temperature of the azodicarbonamide and held at that temperature for some time before the foaming process as such begins with the superatmospheric pressure being relieved, the problem of cell enlargement due to kickers is not encountered, or at least not to the same extent as in the "pressure-free" foaming process, the reason being that, as is known, relatively small cells are formed when the thermoplastic melt is saturated with the nitrogen released by the azodicarbonamide foaming agent as the latter breaks down, which in the prior-art processes is brought about by the use of pressure prior to the foaming process as such. (See also Japanese patent application 40577/77.) In these pressure processes, basic magnesium carbonate, magnesium hydroxide and magnesium oxide are used as auxiliary foaming agents in an amount of not less than 5 and up to 100 weight percent, based on the azodicarbonamide used. According to the examples, 25 weight percent of the magnesium compound is needed to obtain a 20 fold enlargement of the shaped article to be foamed. Without auxiliary foaming agent, a 15 fold enlargement is obtained. Such foaming processes which work with superatmospheric pressure therefore cannot be compared with foaming processes in which normal pressure is employed throughout.

The cannot be lumped together with the "pressure-free" foaming processes also for another reason: The superatmospheric-pressure foaming processes lend thermselves only to the batchwise production of shaped articles in molds, whereas processes employing conditions of normal pressure throughout permit the production of continuous foamed-plastic webs or sheets. (See, for example, German patent application DAS 1,694,130.)

Based on the prior art foaming process in which conditions of normal pressure are employed throughout, the invention has as its object to provide a uniform foamed plastic having low bulk density, especially by a "pressure-free" foaming process.

SUMMARY OF THE INVENTION

In accordance with the invention, this object is accomplished by using as magnesium compound finely divided magnesium oxide and/or magnesium hydroxide and/or magnesium-hydroxide carbonate, and preferably magnesium oxide (MgO).

In the practice of the process in accordance with the invention, the polyolefins may be mixed with the crosslinking agents, foaming agents and, optionally, conventional additives, and with the auxiliary foaming agents used in accordance with the invention, in a roll mill or an extruder, followed by production of the shaped articles, such as plates or continuous sheets, at temperatures below the decomposition point of the peroxide. The average retention time in the mixing means is chosen so that essentially no crosslinking of the mixture to be foamed occurs at this stage. Crosslinking of the polyolefin then takes place below the decomposition point of the foaming agent through decomposition of the crosslinking agent accompanied by an increase in the melt viscosity of the polyolefin. As the temperature is raised further to or above the decomposition temperature of the foaming agent, the shaped article is foamed. Depending on the amount of foaming agent, auxiliary foaming agent and crosslinking agent used and on the operating conditions, the resulting foam will have a bulk density between 15 and 300 kg/m³, and preferably between 20 and 200 kg/m³. The process in accordance with the invention can be employed to particular advantage in the manufacture of continuous foamed-plastic sheets, for example, by the method described in German patent application DAS 1,694,130, which uses conditions of normal pressure.

The foaming agent used is preferably one which liberates gas at elevated temperatures and whose decomposition temperature is higher than that of the organic peroxide used. Suitable foaming agents are, for example, azodicarbonamide and/or p,p'-oxybis benzenesulfonyl hydrazide and/or dinitrosopentamethylenetetramine and the like.

Preferred foaming agents in conjunction with the auxiliary foaming agent in accordance with the invention are those having a decomposition point or range starting at about 190° C. Particularly preferred is azodicarbonamide. The amount of foaming agent to be used depends on the desired bulk density of the foamed plastic to be produced and generally ranges from 0.5 to 25 weight percent, and preferably from 1 to 20 weight percent, based on the total mixture to be formed into a shaped article.

The magnesium compound or compounds which in accordance with the invention are used as auxiliary foaming agents are generally used in an amount of less than 13 weight perent, based on the foaming agent used. Surprisingly, they have the effect of reducing the density of the foamed plastic. In fact, the addition of the auxiliary foaming agents in accordance with the invention to the mixture to be foamed makes it possible to obtain a reduction of the bulk density, essentially determined by the amount of foaming agent used, of up to 20 percent, and occasionally of over 20 percent.

Through the auxiliary foaming agent employed in accordance with the invention, the gas yield of the foaming agent is evidently increased, and this makes it possible in principle to select the desired bulk density of the foamed plastic while using smaller amounts of foaming agent.

Surprisingly, too, it has been found that when more than 13 weight percent of the magnesium compounds, based on the amount of foaming agent used, is employed, the bulk density is not only not reduced but is actually increased. (See comparative example 4.) The best results in terms of a reduced bulk density are obtained when the magnesium compound or compounds are used in amounts of less than 5 weight percent, and preferably less than 3.5 weight percent, and more particularly between 0.5 and 3.3 weight percent, the optimum being about 2 weight percent.

Depending on the polyolefin composition, 2,5-dimethyl-2,5-di(tert. butylperoxy)hexane, tert. butylhydroperoxide, cumyl tert. butyl peroxide or di-tert. butyl peroxide, and preferably dicumyl peroxide, may be used as organic peroxide. The peroxides are used in amounts ranging from 0.3 to 1.5 weight percent.

Suited for use as polyolefins are polyethylene or polypropylene, optionally also mixtures thereof, although polyethylene, and more particularly low-pressure polyethylene of a density of from 0.95 to 0.97 g/cm³ and/or high-pressure polyethylene of a density of from 0.91 to about 0.94 g/cm³, is preferred, high-pressure polyethylene being particularly preferred. However, the term "polyolefins" is intended to include also copolymers, and preferably copolymers produced from monomeric mixtures composed predominantly of ethylene, as well as mixtures thereof with homopolymers. Such copolymers include, for example, ethylene-butylene copolymers, copolymers of ethylene and vinyl acetate and its derivatives, copolymers of ethylene and acryl acid esters or their derivatives, copolymers of ethylene and methacrylic acid or its derivatives, and the like. Mixtures of said polyolefins and rubber and/or plastics may also be processed into foamed materials in accordance with the invention. These include mixtures composed to the extent of 50 weight percent and over of polyethylene and/or polypropylene. Rubbers miscible with said polyolefins are natural rubber, ethylene-propylene rubber, butyl rubber, polyisobutylene, ABS rubber, polybutadiene, polybutene and polyisoprene, for example. plastics miscible with said polyolefins are, for example, polystyrene, chlorinated polyethylene, sulfochlorinated polyethylene or the like.

Conventional additives commonly used with polyolefin-based plastics include light stabilizers, pigments, fillers, flame retardants, antistatic agents, lubricants, etc., which may be added to the mixture to be crosslinked and foamed before it is processed into a shaped article.

In the preferred use of the auxiliary foaming agent according to the invention in combination with azodicarbonamide, crosslinking occurs from about 160° C., and foaming at temperatures from about 190° C. to about 250° C., and preferably to about 220° C.

The preferred foaming agent is magnesium oxide.

Particularly well suited for use in accordance with the invention is caustic magnesium oxide with over 84 weight percent, and preferably over 88 weight percent, MgO.

As is known, caustic grades of magnesium oxide are those which when being calcined undergo a loss in weight. (The weight loss is usually determined at about 1000° C.) The bulk densities of the caustic grades of magnesium oxide generally range from 50 to 800 g/l and are preferably under 500 g/l.

One caustic magnesium oxide is magnesia usta prepared by the chemical route, for example, from crude magnesite by precipitation of the carbonate followed by calcination at a temperature of less than 1000° C. However, caustic magnesium oxide can also be produced by other routes, for example, by direct calcination of magnesite.

When the calcining losses of the preferably used caustic grades of magnesium oxide are determined, it is found that the values generally range from about 1 to less than 10 weight percent, and most often from 2 to 6 weight percent.

The magnesium hydroxides used are preferably pure magnesium hydroxides such as those which are commercially available for pharmaceutical purposes. The bulk densities generally are under 800 g/l and preferably range from 500 to 650 g/l.

Suitable magnesium-hydroxide carbonates (basic carbonates of varying compositions) are those containing from 40 to 45 weight percent MgO. The bulk densities of the commercially available magnesium-hydroxide carbonates generally are under 300 g/l.

The magnesium compounds may be added to the mixture to be foamed either alone or as a mixture, possibly mixed with the foaming agent, and optionally also in the form of a concentrate on a polyolefin.

The foamed plastics produced in accordance with the invention find application in the construction industry as insulating materials providing improved heat insulation because of their lower bulk density, in the packaging industry, and as facings for floors, ceilings and walls, where their low bulk density in conjunction with their uniform foam structure also is an advantage.

The examples which follow will serve to illustrate the invention.

The melt index was determined in conformity with Deutsche Industrie Norm 53,735 (190° C./2.15 kg). The high-pressure polyethylene used had a melt index of 4 g/10 min. and a density of 0.92 g/cm$^3$.

The ethylene-vinyl acetate copolymer used (weight ratio, 92:8) had a melt index of 5 g/10 min.

The magnesium oxide used in examples 1 to 6 and in comparative example 4 had the following chemical composition, as determined by analysis:

| MgO, not less than | 95 wt. % |
| --- | --- |
| Calcining loss (at 1000° C.), max. | 5 wt. % |
| Ca, max. | 2 wt. % |
| Fe, max. | 0.1 wt. % |
| SO$_4$, max. | 0.75 wt. % |
| Cl, max. | 0.15 wt. % |
| Bulk density, 160 g/l | |

The magnesium-hydroxide carbonate used in example 7 had the following chemical composition:

| MgO | 41 wt. % |
| --- | --- |
| Ca | 1 wt. % |
| Fe | 0.02 wt. % |
| Heavy metals (as Pb) | 0.004 wt. % |
| Cl | 0.02 wt. % |
| SO$_4$ | 0.5 wt. % |
| Bulk density, 130 g/l | |

The magnesium hydroxide used in example 8 had the following chemical composition:

| Mg(OH)$_2$ | over 95 wt. % |
| --- | --- |
| Cl | under 0.05 wt. % |
| SO$_4$ | under 0.1 |
| Heavy metals (as Pb) | under 0.002 wt. % |
| Fe | under 0.04 wt. % |
| As | under 0.0002 wt. % |
| Ca | under 0.5 wt. % |
| Water-soluble constituents | under 1 wt. % |
| Calcining loss (at 800° C.) | 31 wt. % |
| Bulk density, 650 g/l | |

COMPARATIVE EXAMPLE 1

84 parts by weight high-pressure polyethylene,
1 part by weight dicumyl peroxide, and
15 parts by weight azodicarbonamide
were compounded in a roll mill at a roll surface temperature of 110° C. for a milling time of 20 min. The material was then taken off the rolls as a sheet and pressed in a press at 130° C. and a retention time of 8 min. to give a 4-mm-thick smooth-surfaced plate. Specimens 8 cm in diameter were then punched out of the plate and foamed at 210° C. in a drying cabinet to give foamed articles of a thickness of 13.5 mm and a bulk density of 31 kg/m$^3$. The bulk density of the foam is determined by the formulation.

EXAMPLE 1

84 parts by weight high-pressure polyethylene (as in comparative example 1),
1 part by weight dicumyl peroxide,
15 parts by weight azodicarbonamide, and
0.3 parts by weight magnesium oxide (representing 2 wt. %, based on the azodicarbonamide).

The processing procedure and conditions were the same as in comparative example 1. A foam of a thickness of 16 mm and a bulk density of 25 kg/m$^3$ was obtained.

COMPARATIVE EXAMPLE 2

84 parts by weight high-pressure polyethylene (as in comparative example 1),
1 part by weight dicumyl peroxide,
15 parts by weight azodicarbonamide, and
2 parts by weight of a blue pigment concentrate commercially available under the designation SICOVERSAL ® Blue 23075.

The processing procedure and conditions were the same as in comparative example 1. A foam of a thickness of 12 mm and a bulk density of 36 kg/m$^3$ was obtained.

EXAMPLE 2

84 parts by weight high-pressure polyethylene (as in comparative example 1),
1 part by weight dicumyl peroxide,
15 parts by weight azodicarbonamide,
2 parts by weight blue pigment concentrate (as in comparative example 2), and
0.3 part by weight magnesium oxide (representing 2 wt. % MgO, based on the azodicarbonamide).

The processing procedure and conditions were the same as in comparative example 1. A foam of a thickness of 14 mm and a bulk density of 29 kg/m$^3$ was obtained.

EXAMPLE 3

84 parts by weight high-pressure polyethylene,
1 part by weight dicumyl peroxide,
15 parts by weight azodicarbonamide, and
0.1 part by weight MgO (representing about 0.7 wt % MgO, based on the azodicarbonamide).

The processing procedure and conditions were the same as in comparative example 1. A foam of a thickness of 14.5 mm and a bulk density of 27 kg/m$^3$ was obtained.

COMPARATIVE EXAMPLE 3

84 parts by weight high-pressure polyethylene (as in comparative example 1),
1 part by weight dicumyl peroxide,
15 parts by weight azodicarbonamide, and
2 parts by weight MgO (representing 13 wt. %, based on the azodicarbonamide).

The processing procedure and conditions were the same as in comparative example 1. A foam of a thickness of 17 mm and a bulk density of 31 kg/m$^3$ was obtained.

COMPARATIVE EXAMPLE 4

84 parts by weight high-pressure polyethylene (as in comparative example 1),
1 part by weight dicumyl peroxide,
15 parts by weight azodicarbonamide, and 3 parts by weight MgO (representing 20 wt. % MgO, based on the azodicarbonamide).

The processing procedure and conditions were the same as in comparative example 1. A foam of a thickness of 15 mm and a bulk density of 35 kg/m³ was obtained.

EXAMPLE 4

84 parts by weight high-pressure polyethylene (as in comparative example 1),
1 part by weight dicumyl peroxide,
15 parts by weight azodicarbonamide, and
0.5 part by weight MgO (representing 3.3 wt. %, based on the azodicarbonamide).

The processing procedure and conditions were the same as in comparative example 1. A foam of a thickness of 16 mm and a bulk density of 25 kg/m³ was obtained. No bulk-density reduction over example 1 was realized.

COMPARATIVE EXAMPLE 5

78.8 parts by weight ethylene-vinyl aceta copolymer,
0.7 part by weight dicumyl peroxide, and
20.5 parts by weight azodicarbonamide.

The processing procedure and conditions were the same as in comparative example 1. A foam of a thickness of 15.5 mm and a bulk density of 25 kg/m³ was obtained.

EXAMPLE 5

78.8 parts by weight ethylene-vinyl acetate copolymer,
0.7 parts by weight dicumyl peroxide,
20.5 parts by weight azodicarbonamide, and
0.4 part by weight MgO (representing about 2 wt. %, based on the azodicarbonamide).

The processing procedure and conditions were the same as in comparative example 1. A foam of a thickness of 16.5 mm and a bulk density of 20 kg/m³ was obtained.

COMPARATIVE EXAMPLE 6

88.9 part by weight high-pressure polyethylene,
1.1 parts by weight dicumyl peroxide, and
10.0 parts by weight azodicarbonamide.

The processing procedure and conditions were the same as in comparative example 1. A foam of a thickness of 13 mm and a bulk density of 48 kg/m³ was obtained.

EXAMPLE 6

88.9 parts by weight high-pressure polyethylene,
1.1 parts by weight dicumyl peroxide,
10 parts by weight azodicarbonamide, and
0.3 part by weight MgO (representing 3 wt. %, based on the azodicarbonamide).

The processing procedure and conditions were the same as in comparative example 1. A foam of a thickness of 14 mm and a bulk density of 40 kg/m³ was obtained.

EXAMPLE 7

84 parts by weight high-pressure polyethylene,
1 part by weight dicumyl peroxide,
15 parts by weight azodicarbonamide, and
0.3 part by weight magnesium-hydroxide carbonate (representing 2 wt. %, based on the azodicarbonamide).

The processing procedure and conditions were the same as in comparative example 1. A foam of a thickness of 13.5 mm and a bulk density of 27 kg/m³ was obtained.

EXAMPLE 8

84 parts by weight high-pressure polyethylene,
1 part by weight dicumyl peroxide,
15 parts by weight azodicarbonamide, and
0.3 part by weight magnesium hydroxide (representing 2 wt. %, based on the azodicarbonamide).

The processing procedure and conditions were the same as in comparative example 1. A foam of a thickness of 13.5 mm and a bulk density of 28 kg/m³ was obtained.

What is claimed is:

1. In a process for the production of foamed plastics from polyolefins by peroxide crosslinking and foaming by means of a chemically decomposing foaming agent under conditions of normal pressure the improvement wherein said foaming is carried out in the additional presence of less than 13 weight percent, based on the amount of foaming agent, of magnesium oxide and/or magnesium hydroxide and/or magnesium-hydroxide carbonate having a bulk density of under 800 g/l.

2. A process according to claim 1 wherein the magnesium compound is present in the mixture to be foamed in an amount of less than 5 weight percent.

3. A process according to claim 1 wherein the magnesium oxide used is a caustic magnesium oxide with over 84 weight percent MgO, and preferably over 88 weight percent MgO.

4. A process according to claim 1 wherein the foaming agent used is one whose decomposition or decomposition range is about 190° C. or higher, preferably azodicarbonamide.

5. A process according to claim 2 wherein said magnesium compound is present in the mixture to be foamed in an amount of less than 3.5 weight percent, based on the amount of foaming agent.

6. A process according to claim 2 wherein said magnesium compound is present in the mixture to be foamed in an amount of between 0.5 and 3.3 weight percent, based on the amount of foaming agent.

7. A process according to claim 1 wherein said magnesium compound is magnesium oxide.

* * * * *